United States Patent [19]

White

[11] Patent Number: 5,361,379
[45] Date of Patent: Nov. 1, 1994

[54] SOFT-DECISION CLASSIFIER

[75] Inventor: Stanley A. White, San Clemente, Calif.

[73] Assignee: Rockwell International Corporation, Seal Beach, Calif.

[21] Appl. No.: 988,364

[22] Filed: Dec. 9, 1992

Related U.S. Application Data

[63] Continuation of Ser. No. 770,381, Oct. 3, 1991, abandoned.

[51] Int. Cl.$^5$ .............................................. G06F 15/36
[52] U.S. Cl. ..................................... 382/36; 340/937; 364/516; 395/61; 382/38
[58] Field of Search ..................... 395/61; 382/36, 37, 382/38, 39; 340/937; 364/516

[56] References Cited

U.S. PATENT DOCUMENTS

| | | | |
|---|---|---|---|
| 4,025,920 | 5/1977 | Reitboeck et al. | 342/13 |
| 4,589,131 | 5/1986 | Horvath et al. | 381/38 |
| 4,773,099 | 9/1988 | Bokser | 382/14 |
| 4,860,216 | 8/1989 | Linsenmayer | 364/516 |

OTHER PUBLICATIONS

Parsaye et al., Expert Systems for Experts, John Wiley & Sons, Inc, 1988, 211–233, 241–249.

Taylor et al., "Classification Quality Assessment for a Generalized Model–Based Object Identification System," IEEE Trans. on Systems, Man, and Cybernetics, vol. 19, 4, 1989, 861–866.

Binaghi et al., "Fuzzy Logic Based Tools for Classification and Reasoning with Uncertainty", Tools for AI., Oct. 1989, 572–577.

Larson, "Introduction to Probability Theory and Statistical Inference," Wiley and Sons, 1982, pp. 382–385, 363–364.

Hogg et al., "Introduction to Mathematical Statistics", Fourth Edition, MacMillan Publishing Co, 1978, pp. 13, 257–259.

Hero, et al., "Simultaneous Signal Detection and Classification Under a False Alarm Constraint," ICASSP, Apr. 1990, 2759–2762.

Lee et al., "Fast Likelihood Classification", IEEE Trans. on Geoscience and Remote Sensing, Jul. 1991, 509–517.

Jaggi, S., "A Two-Channel PC-Based Hardware Implementation of the Maximum Likelihood Classifier for the Shuttle Ice Detection System," IEEE Proc. of SoutheastCon '91, Apr. 1991, 591–595.

*Primary Examiner*—Robert W. Downs
*Attorney, Agent, or Firm*—H. Fredrick Hamann; George A. Montanye; Tom Streeter

[57] ABSTRACT

An apparatus and method are disclosed for classifying a signal among a plurality of potential signal sources or events in which a signal embodying values for predefined source features is received and conditional likelihoods are determined for the correspondence of each feature value with each of the plurality of events. The individual conditional likelihood values for each feature which corresponds to a common event are multiplied together to form an overall conditional likelihood that any event in question is the source of the signal. The total likelihood products are then sorted into maximum and minimum values, with the maximum likelihood forming a tentative output designation. The ranked values are then examined by a decision logic element to determine if they satisfy certain minimum absolute and relative value threshold limits to verify if the maximum or next higher level likelihood values designate proper output choices. Depending on the results of the threshold tests, one, two, or no signal sources or events are chosen for a signal classification output. At the same time, a conditional probability for the chosen signal is used to indicate a confidence level in the selected choice.

15 Claims, 4 Drawing Sheets

SOFT-DECISION CLASSIFIER

This is a continuation of copending application(s) Ser. No. 07/770,381 filed on Oct. 3, 1991, now abandoned.

BACKGROUND OF THE INVENTION

1. Field of the Invention

The present invention relates to signal processing and classification and more particularly to a technique for determining the likelihood that a received signal is the result of a preselected event. The invention further relates to a method for classifying signals utilizing a range of selective criteria which is applied in such a manner to received data so as to form an array of likelihood values from which a best fit is selected.

2. Related Technical Art

Previous attempts to classify and analyze signals or data as related to specific events have generally been limited to applying classical "crisp" of fixed logical relationships to extracted signal features of parameters. A signal is typically classified through application of, and strict adherence to, a limited set of predefined signal parameters to which a highly constrained set of probabilities is applied to decide to what specific event or class of events a signal relates. That is, the received data is employed in a technique that requires the signal parameters to fit exactly one set of values. When a sufficiently large database of background classification information exists and processing time is not limited, this process works well.

Unfortunately the feature or parameter set describing a signal or observed object cannot always be crisply defined because of incomplete or inaccurate knowledge about the events being observed. This is especially true where speed is often of the essence in gathering data, under less than ideal conditions with a minimum of computing resources and accuracy of data. This is especially true where the rules for structuring the accrued database are less than precise. The available information in a knowledge database is often only sufficient to place a given parameter value under analysis in a general category. Therefore, it would be desirable to apply some form of "fuzzy" or less rigid logical classification structure to the process.

What is needed is a method and apparatus for applying flexible classification rules or approximate likelihoods to arrive at a decision in a highly efficient structure which is easily constructed using currently available technology.

Although the field of "fuzzy logic" was established by the mathematical community in the 1920's, it was not until about 1960 that the engineering community became aware of it, and not until in the late 1980's before the Japanese began applying the methodology to control of trains, elevators, heating plants, and a variety of consumer products (e.g. autofocus cameras).

In addition, while there is at least one company in the United States specializing in fuzzy logic engineering (Togi InfraLogic) and several textbooks currently available on the subject, see: G. J. Klir and T. A. Folger, *Fuzzy Sets, Uncertainty, and Information*, Prentice Hall, 1988; J. C. Bezdek, *Pattern Recognition with Fuzzy Objective Function Algorithms*, Plenum Press, 1987; and B. Kosko, *Neutral Networks and Fuzzy Systems*, Prentice Hall, 1992; there appears to be remarkably few applications, particularly within the United States.

SUMMARY

In view of the above problems associated with the art and desired new features, it is one purpose of the present invention to provide a method and apparatus for classifying signals which provides flexible or fuzzy decision rules.

An advantage of the invention is that it provides a dynamic high speed processing technique for improved signal classification.

These and other purposes, advantages, and objects are accomplished in an apparatus and method for classifying a signal among a plurality of potential signal sources or events in which a signal embodying values for predefined source features is received and conditional likelihoods are determined for the correspondence of each feature within the signal to each of the events. A feature extraction element typically receives the input signal and provides a feature set output which allows for the parallel testing of each feature. The feature values are transferred to a likelihood element in which conditional likelihoods are determined for the correspondence of each feature value with each of the plurality of events. Conditional likelihoods are typically determined by applying each input feature value in parallel to a plurality of likelihood tests, each test corresponding to a test for that feature for each event for which the input signal is being classified. This is easily implemented by applying each feature value to a memory element, such as a RAM or ROM circuit, as an address which selects an output corresponding to a position along an event likelihood function curve for the feature in question. Each memory element contains precomputed likelihood values for the occurrence of one feature within one event.

The individual conditional likelihood values for each feature which corresponds to a common event are multiplied together to form a total conditional likelihood that any event in question is the source of the signal. This is preferably accomplished by transferring these likelihood values to a single multiplication element for each event. The resulting products represent the overall conditional likelihood that any event in question is the source of the signal. The total likelihood products are then sorted into maximum and minimum values, with the maximum likelihood forming a tentative output designation. The ranked values are then examined by a decision logic element to determine if the maximum or other sorted likelihoods satisfy certain minimum absolute and relative value threshold criteria to verify that they properly designate output choices. It is advisable to verify the absolute magnitude of the maximum likelihood value to assure that it is a significant event compared to noise or system accuracy and to also demand that this value have at least a minimum separation in magnitude from the next lower maximum value. Depending on the results of the threshold tests, one, two or no signal sources or events are chosen for a signal classification output. At the same time, a conditional probability for the chosen signal is used to indicate a confidence level in the selected choice.

The signal source or event corresponding to the maximum likelihood is designated as an output when that likelihood both exceeds a preselected first threshold and next maximum likelihood by a second preselected threshold. If, instead, the maximum likelihood exceeds the first threshold level but does not exceed the next maximum likelihood by the second threshold level and the next maximum exceeds a lower maximum by the second threshold, both signal sources which correspond to the maximum and next maximum source likelihood values are selected as output values. In the alternative, for small numbers of events, say three, the one event not involved in a tie with the maximum can be designated as an output. Finally, a "no output" event designation is made when either the maximum likelihood does not exceed the first threshold, or the maximum does not exceed the next maximum likelihood and the next maximum does exceed a lower maximum by the second preselected threshold.

In further aspects of the invention, a confidence level is generated for the output decision from conditional probabilities of the likelihood values corresponding to the designated event or sources. This is accomplished by dividing the maximum likelihood by the sum of all conditional likelihoods to provide a confidence in the maximum likelihood value, and dividing a minimum likelihood by the sum of all conditional likelihoods and subtracting the result from one to provide a confidence in multiple likelihood values.

The method of, and apparatus for, providing one output event choice corresponding to the maximum source likelihood, comprises first determining if the maximum likelihood exceeds the preselected first threshold in a first comparison element and then determining if it also exceeds the next maximum likelihood by the second preselected threshold in a second comparison element and providing bi-level ("1" or "0") digital output states (bi-state) on "yes" and "no" output lines. A first logic AND operation is applied to the "yes" output lines for both of these comparison elements typically by using a first two-input AND gate which provides a logic high level output when both inputs are high. When and AND operation, gate output, generates a logic high state the maximum likelihood is selected as an output. To provide two designations for the signal source, it must also be determined if the next maximum also exceeds a lower maximum likelihood, or minimum, by the second preselected threshold in a third comparison element which also provides bi-level logic output signals on "yes" and "no" output lines. A second logic AND operation is applied to the "yes" outputs for the first and third comparison elements and the "no" output for the second comparison element. This is generally accomplished using a three-input AND gate. When the AND operation generates a logic high state the maximum and next-maximum events are chosen as outputs. "No event" designations are provided when the threshold tests are not met. A third logic AND operation is applied to the "no" outputs for both the second and third comparison elements, generally using a second two-input AND gate. In addition, a logic OR operation is applied to both the output of the third logic AND operation and the "no" output of the first comparison element, generally using a two-input OR gate. When the OR operation provides a high logic level output, "no event" or identification of the source is output.

The output states for the decision logic can be provided to a variety of decoding devices which interpret the output signals to designate particular events. At the same time, the likelihood signals can be received by an output selector which uses the decision choices to output, or switchably select, the event corresponding to designated likelihood values.

The method and apparatus can also be made more flexibly by incorporating a mechanism for dynamically assigning or altering the threshold levels used for selecting the outputs.

BRIEF DESCRIPTION OF THE DRAWINGS

The novel features of the present invention may be better understood from the accompanying description when taken in conjunction with the accompanying drawings in which like numbers refer to like elements, and in which.

DETAILED DESCRIPTION OF A PREFERRED EMBODIMENT

The present invention provides a method and apparatus for classifying a received signal as to a likelihood of origin. That is, what is the likelihood that a particular signal, or data, was generated by, or as the result of, a particular event. The invention determines whether the signal represents information that would have most likely been provided as the result of measuring, detecting, or monitoring the occurrence of a particular event among a number of similar potential events. This is accomplished by extracting information from received signals relating to predefined event features. The extracted feature values are compared to classes of feature criteria corresponding to events or signal sources of interest. Conditional likelihoods are determined for each feature and those corresponding to the same event are then combined to provide a conditional likelihood for each event. The event likelihood values are then sorted to rank the most likely, least likely, and in-between likelihood events in terms of the likelihood values. These values are also used in conjunction with preset threshold levels to formulate a confidence determination that the most likely event is an appropriate selection as a most likely event for output. If the confidence determination warrants, either "toss-up" or "do not know" responses are provided.

The classification process provided by the invention can be applied to data provided by a variety of sensors, detectors, imaging systems, or receivers where the input signals represent information about scenes, physical interactions, intercepted RF signals, et cetara. The input information or signals may be provided by a variety of input devices, as would be apparent to those skilled in the art.

Figure 1:
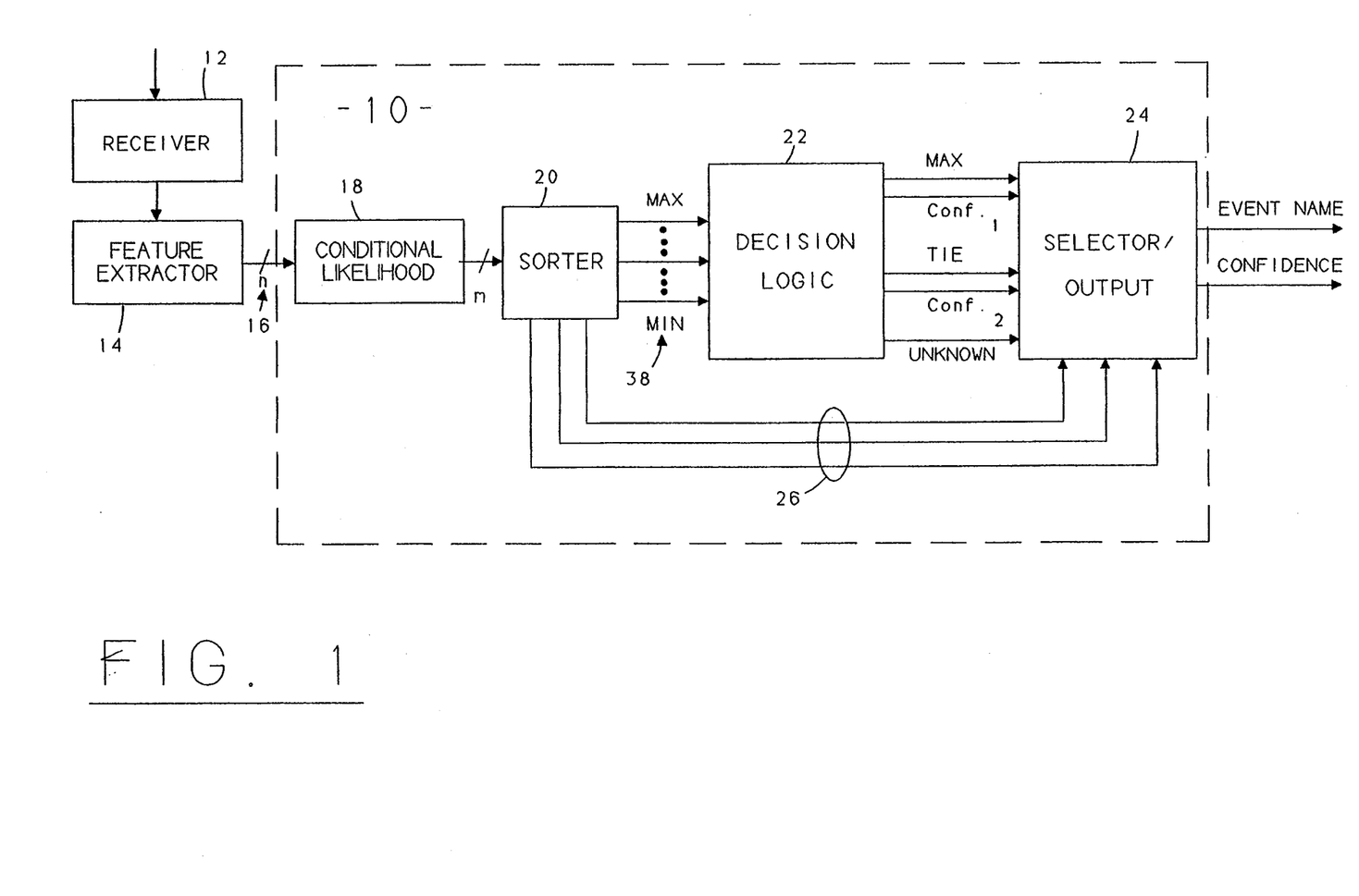
FIG. 1 illustrates an overview of a measurement classifier constructed according to the principles of the present invention.

An overview schematic of a soft-decision input classifier build and operating according to the principles of the invention is illustrated in FIG. 1. In FIG. 1, the incoming signals are detected by the appropriate sensors or receivers 12, including any desired preliminary signals processing stage. This would include preamplification, equalization, attenuation, filtering, digitizing, et cetera, that is applied to account for the signal environment, path aberrations, or classifier characteristics before the signal is analyzed.

The incoming signals, or information contained therein, can be viewed as a set of features values. The signals generally contain information either as variation in signal characteristics, such as amplitude, frequency, and phase or pulse separation, or encoded, such as in modulation or digital bit patterns, within the signal structure. The specific feature information embodied in the signal depends on the classification application and particular events. Examples include direction, magnitude, and time for seismic events; color, texture, light levels, motion, for visual scene observations (image recognition or manufacturing control); and dimensions, weight, and shapes for objects. It is clear that a variety of information can be represented by the input signals and those skilled in the art are familiar with the methods for transferring this information.

An example which is useful for purposed of illustrating the invention is sensory input data which is used to indicate the speed, length, overall weight, and direction of travel for vehicles, convoys, or trains (multi-segment vehicles) in a scene. The scene represents a field of view for a given set or data or image sensors which provides the information to be classified. From such data the speed, size, direction, etc. could be used to classify a moving vehicle as falling within one of several preselected categories such as commercial, military, or private.

The received signals are transferred into a feature extractor 14 which represents circuitry or elements known to those skilled in the art for interpreting or deconvolving the input signal to provide various feature values. Those skilled in the art are more than familiar with information extraction, such as where the signal amplitude represents increasing weight values from a motion detector, and will construct the extraction element according to the needs of the specific classification application. The feature information in a signal can be extracted on a feature-by-feature basis and transferred serially in a preferred sequence or in a parallel block transfer. The extracted information or feature signals can be viewed as feature vectors or a series of parallel feature buses depending upon the particular application and operation method (series versus parallel) and associated timing and control. For purposes of illustration the feature set from the input signals is treated herein as an input feature vector which is transferred along the feature input bus 16.

An example for observational data might be one or more objects in a scene or field of view. One type of object is the fixed object like a building, which the other type of objects in a scene are moving objects which includes vehicles, convoys, or trains. A building vector might have components such as:

| b: = | 800 | Overall area in square feet |
|---|---|---|
| | 0.25 | Max/min height, 1.00 full scale |
| | 247 | Thermal emissions, 1000 normalized scale |
| | 0.80 | Reflectivity of surface, 1.00 full scale | whereas a segmented vehicle, such as a train, vector might be:

| v: = | 30 | Speed in mph |
|---|---|---|
| | 0.25 | Max/min height, 1.00 full scale |
| | 0.20 | Max/min length, 1.00 |
| | 30 | Total number of cars |

The extracted feature values are examined in a conditional likelihood discriminator 18 for coincidence with, or a match to, known events or signal sources. Generally, a database or library of information is compiled from previous measurements made of a number of events, observations, data sources, et cetera. The desire is to be able to classify a particular measured event or input signal from an event as being one, m, or a number of M measured events where $0 \leq m \leq M-1$. The event m which is being observed or measured generally provides a variety of data values indicative of differing characteristics of the event. Therefore, each observed event can be described by an N-dimensional feature vector where each component of the vector represents the value of a particular, preselected, feature.

The feature value vector v resulting from these input signals can be expressed as $v = [v_0, v_1, v_2, \ldots, v_{N-1}]^T$ where N is the total number of features in the feature set for the specific application of interest, $0 \leq n \leq N-1$. If the total number of events m is M, $0 \leq m \leq M-1$, then there are MN different conditional likelihoods that any given feature n falls within a given event m.

In the conventional approach, the component values of the input feature vector v are compared to the prestored database values in order to decide to which of the M events it is most closely related. A judgment is made as to the occurrence of each feature: did this come from a particular source or event? However, highly constrained choice rules are had to apply and crisp logic is not viable for many applications. Therefore, the present invention does not simply compare the feature vector to prestored, singular feature values to make classification decisions. Instead, a fuzzified or less crisp solution in which all such choices are typically fuzzified and then correlated to produce the final decision.

Therefore, there is an array or database of conditional likelihoods that any one feature n belongs to a given event m, and each of these likelihoods will be defined as a functional variable which allows for imprecise or fuzzy classifications. If each of the individual conditional likelihoods is labeled as $w_{n,m}$ then the totality of likelihoods for the M events can be viewed as forming a conditional likelihood matrix [W] where:

$$[W] = W_{nm} = W_{n,m}$$

or where each likelihood is represented as a functional variable $f_{n,m}$ a variable conditional likelihood matrix [F] is formed such that:

$$[F] = [f_{nm}(v_n)] = w_{n,m}$$

If the example of viewing a moving train in a field of view (scene) is used a series of exemplary feature vectors and the corresponding likelihood computations might be presented as follows. Suppose the first feature vector component has a value in a range between 0 and 100, such as between zero and one hundred miles per hour for a velocity measurement, or:

$$0 \leq v_0 \leq 100$$

For this particular feature, a series of likelihoods could be constructed based on a priori knowledge of the system or events under observation. While there is uncertainty as to the exact nature of the observed data, there is some certainty as to the limits in which it falls. Based on this knowledge, a guess, or experience the conditional likelihoods are formed. An exemplary set of likelihood functions for the velocity feature example could be:

If $v_0 \geq 60$ then $f_{00}(v_0) = [\cos[(v_0 - 60)\pi/80)]]^2$, otherwise
$f_{00}(v_0) = [\cos[(v_0 - 60)\pi/120]]^2$;

If $v_0 \leq 80$, and
if $v_0 \leq 45$ then $f_{01}(v_0) = [\cos[(v_0 - 45)\pi/90)]]^2$,
otherwise $f_{01}(v_0) = [\cos[(v_0 - 45)\pi/70)]]^2$,
otherwise $f_{01}(v_0) = 0.01$.

If $v_0 \leq 80$, and
if $v_0 \leq 35$ then $f_{02}(v_0) = [\cos[(v_0 - 35)\pi/70)]]^2$,
otherwise $f_{02}(v_0) = [\cos[(v_0 - 35)\pi/90)]]^4$,
otherwise $f_{02}(v_0) = 0.01$.

where $w_{0,0} = f_{00}[v_0]$, $w_{0,1} = f_{01}[v_0]$, $w_{0,2} = f_{02}[v_0]$.

Notice that the velocity functions do not have large discontinuities or sudden changes between adjacent values. Each application determines the specific nature of the transitions between the values for different events but the general nature of most applications implies gradual predictable shifts in feature values between events. A blurring or fuzziness of the certainties as to where the value lays, as it were. The cosine functions employed here represent a good approximation of a class of such applications.

As the same time, a series of similar functions can be defined or arrived at for the remaining N, or 4 here, features in the feature set. Staying with the above vehicle example an exemplary set of functions would be:

For $0 \leq v_1 \leq 5$
If $v_1 \leq 5$ then $f_{10}(v_1) = [\cos(v_1\pi/10)]^8$, otherwise $f_{10} = 0$,
$f_{11}(v_1) = v_1 e^{-v_1}(8/3)$, and
$f_{12}(v_1) = (5 - v_1)e^{(v_1-5)}(8/3)$;
and $w_{1,0} = f_{10}[v_1]$, $w_{1,1} = f_{11}[v_1]$, $w_{1,2} = f_{12}[v_1]$
For $0 \leq v_2 \leq 3$
$f_{20} = [\cos(v_2 - 1/6)\pi]^2$,
$f_{21} = [\cos(v_2 - 2/6)\pi]^2$,
$f_{22} = [\cos(v_2 - 3/6)\pi]^2$,
(note these functions are assigned in a more restrictive manner but are still variable)
and $w_{2,0} = f_{20}[v_2]$, $w_{2,1} = f_{21}[v_2]$, $w_{2,2} = f_{22}[v_2]$
For $0 \leq v_3 \leq 100$
If $v_3 \leq 15$ then $f_{30} = 1.0$,
if $v_3 \geq 50$ then $f_{30} = 0.01$, otherwise
$f_{30} = [\cos[(v_3 - 15)/35]]^2$;
If $v_3 \leq 40$ then $f_{31} = 1.0$,
if $v_3 \geq 100$ then $f_{31} = 0$, otherwise
$f_{31} = [\cos[(v_3 - 40)/60]]^2$;
If $v_3 \leq 10$ then $f_{32} = 1.0$,
if $v_3 \geq 30$ then $f_{32} = 1.0$, otherwise
$f_{32} = [\cos[(v_3 - 10)/20]]^2$;
and $w_{3,0} = f_{30}[v_3]$, $w_{3,1} = f_{31}[v_3]$, $w_{3,2} = f_{32}[v_3]$ Finally, these functions are used to provide conditional likelihood values for each of the features which results in the matrices:

$$[W] = \begin{bmatrix} w_{0,0} & w_{0,1} & w_{0,2} & \cdots & w_{0,M-1} \\ w_{1,0} & w_{1,1} & w_{1,2} & \cdots & w_{1,M-1} \\ w_{2,0} & w_{2,1} & w_{2,2} & \cdots & w_{2,M-1} \\ w_{3,0} & w_{3,1} & w_{3,2} & \cdots & w_{3,M-1} \\ \vdots & \vdots & \vdots & & \vdots \\ w_{n,0} & w_{n,1} & w_{n,2} & \cdots & w_{n,M-1} \end{bmatrix}$$

OR $$[W] = [F] = \begin{bmatrix} f_{00}(v_0) & f_{01}(v_0) & f_{02}(v_0) & \cdots & f_{0m}(v_0) \\ f_{10}(v_1) & f_{11}(v_1) & f_{12}(v_1) & \cdots & f_{1m}(v_1) \\ f_{20}(v_2) & f_{21}(v_2) & f_{22}(v_2) & \cdots & f_{2m}(v_2) \\ f_{30}(v_3) & f_{31}(v_3) & f_{32}(v_3) & \cdots & f_{3m}(v_3) \\ \vdots & \vdots & \vdots & & \vdots \\ f_{n0}(v_n) & f_{n1}(v_n) & f_{n2}(v_n) & \cdots & f_{nm}(v_n) \end{bmatrix}$$

where each column represents a particular event, m, and each row a particular feature.

Therefore, the data received from one or more observations of a particular item under analysis, such as the vehicle in a scene discussed before, might provide likelihood outputs of:

$$[W] = \begin{bmatrix} p & f & d \\ 0.5 & 0.75 & 0.95 \\ 0.906 & 0.809 & 0.133 \\ 0.835 & 0.345 & 0.011 \\ 0.827 & 1.0 & 0.01 \end{bmatrix} \begin{matrix} \text{Likelihood Parameter} \\ \text{Speed} \\ \text{Weight} \\ \text{Fractional length} \\ \text{Total Length} \end{matrix}$$

where each column represents the likelihood values for each of the features chosen for analysis with respect to one item or event. The first column here would represent the conditional likelihoods with respect to features as found in passenger trains (p), the second column is for data related to freight trains (f) and the third is for a desired (d) special train.

Those skilled in the art will readily appreciate that any event or item to be used as a basis for classification will have its own set of preferred classification features and a database of corresponding or associated value functions according to the particular application. Another example would be the analysis of RF transmission sources where frequency, direction, incident power, phase delays, and other information allows the approximate differentiation of signals into three or more potential source classifications, such as military, commercial, private transmission.

The determination or generation of conditional likelihood values for each input feature in relation to each predefined event can be achieved using several look-up table or storage techniques known to those skilled in the art. An exemplary device for determining the conditional likelihood values for the input vector components is illustrated in further detail in FIG. 2.

Figure 2:
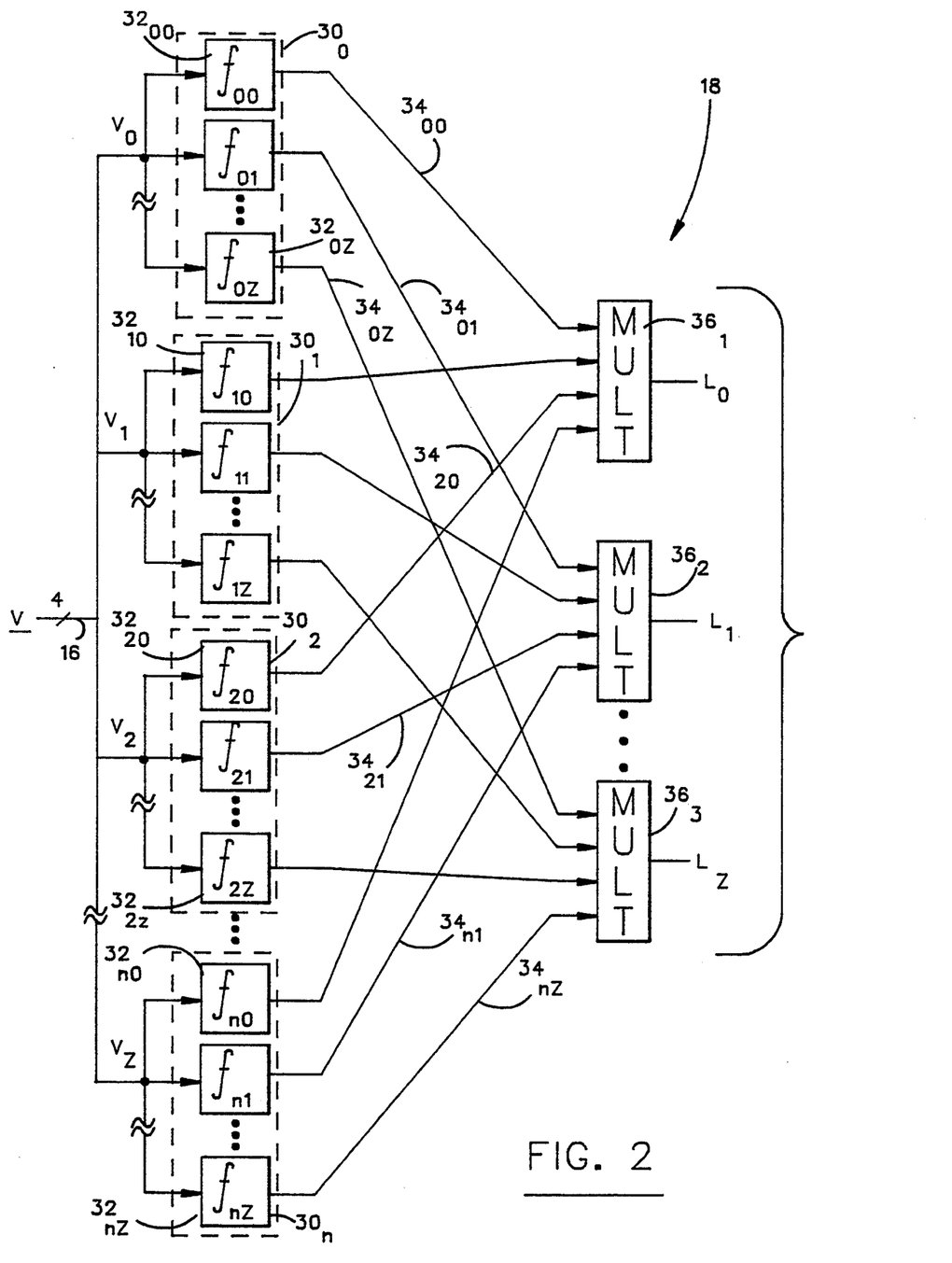
FIG. 2 illustrates a conditional likelihood determination device useful in constructing the classifier of FIG. 1.

In FIG. 2, the likelihood computation element 18 is connected to the input vector bus 16 of the fuzzy classifier 10 and directs each discriminant vector component, feature value, to one, n, of N groups, where $0 \leq n \leq N-1$, of classification bins or elements $30_n$ ($30_0$, $30_1$, $30_2$, ..., $30_n$). The number of groups $30_n$ is determined by the number of features which corresponds to the number of elements in the feature vector here N=4. Within each group $30_n$ of classification bins, reside individual classification elements $32_{nm}$ ($30_{00}$, $30_{01}$, ..., $30_{0m}$, $30_{10}$, $30_{11}$, ..., $30_{1m}$, $30_{20}$, $30_{21}$, ..., $30_{2m}$, $30_{n0}$, $30_{n1}$, ..., $30_{nm}$) which contain the classification function information as shown above. The number of classification elements depends on the total number of events, m, from which a choice is made.

The classification elements 30 can implement the desired classification criteria or event functions using several techniques. One technique is to employ decision logic elements such as comparators, AND gates, and OR gates, and the like to generate a preset value for each feature value input. However, the complexity of this approach makes it both less reliable, from a manufacturing point of view, and very similar to the present fixed or crisp logic techniques that are to be avoided, so is less desirable. Therefore, the present invention employs a second technique.

The preferred technique for conditions likelihood generation is to employ memory or storage devices such as ROM or RAM circuits in which the likelihood values, or an array of values which result from the chosen functions, are prestored at addresses that are selected by the value of the feature vector, v, component input. That is, as each vector component, $v_0$, $v_1$, $v_2$, $v_3$, is transferred to one of the likelihood elements $32_{nm}$, it acts as an address value of abcissa which selects a prestored conditional likelihood value corresponding to the feature value, or ordinate. Each element $32_{nm}$ provides a conditional likelihood output of the form $f_{nm}(v_n)$ where $f_{nm}$ is the preselected likelihood function. In this manner, a specific vector component is analyzed for a conditional likelihood that it occurred as a result of any of M events.

It will be apparent to those skilled in the art that the specific functions chosen and the values stored in memory devices to represent the functions are dependent upon the application or knowledge about events being classified. The resolution and accuracy of the likelihood generation also impacts the size of memory needed.

Once the individual conditional likelihoods have been generated within each event, the next step is to derive a reasonable answer as to which event the input data represents, or an unconditional likelihood that the signal vector v was generated by a particular event m. This derivation uses the computation of a likelihood for the presence of each feature within the event to formulate a total likelihood vector L. Each component of the likelihood vector comprises the overall likelihood that a component of the input discriminant vector v falls within a particular value. That is, the likelihood for all tests for an event are multiplied together to see if the total vector would be more likely to fall within the event.

The unconditional likelihood vector L represents the likelihood that the signal under analysis, or its corresponding feature vector (set) v, were generated by an event or cause m. This likelihood is the product of all of the feature likelihoods for that event. Therefore:

$$L_m = \prod_n w_{n,m}$$

If a vector u is defined as comprising unit elements (1) such that:

$$\underline{u} = \begin{bmatrix} 1 \\ 1 \\ 1 \\ 1 \\ 1 \end{bmatrix}$$

then the vector $\underline{L}$ is:

$$\underline{L} = \begin{bmatrix} w_{0,0} * w_{1,0} * w_{2,0} * w_{3,0} \\ w_{0,1} * w_{1,1} * w_{2,1} * w_{3,1} \\ w_{0,2} * w_{1,2} * w_{2,2} * w_{3,2} \\ \cdot \quad \cdot \quad \cdot \quad \cdot \\ \cdot \quad \cdot \quad \cdot \quad \cdot \\ \cdot \quad \cdot \quad \cdot \quad \cdot \\ w_{0,m} * w_{1,m} * w_{2,m} * w_{3,m} \end{bmatrix} = [W]\underline{u}$$

and for the velocity and other feature values used in the above example results in:

$$[L] = \begin{bmatrix} 0.313 \\ 0.21 \\ 1.384 * 10 - 5 \end{bmatrix} \begin{matrix} p \\ f \\ d \end{matrix}$$

It should be noted that these values are still likelihood values and not probabilities which requires normalization.

Returning to FIG. 2, the outputs from the various likelihood elements $32_{nm}$ are transferred along corresponding buses $34_{nm}$ to one of n multipliers 36 ($36_1$, $36_2$, ..., $36_m$) to provide the total likelihood for each event m. The outputs from the elements $32_{nm}$ are associated or grouped according to event, that is, according to that event for which they were applying a feature function. In the embodiment of FIG. 2, each of the top most likelihood elements apply tests for a first event. The next row of elements in each set applies tests for a second event and so forth. It should be readily understood that there must be an association of the feature tests for each element within an event and the event itself. However, there is no strict requirement for a particular physical element placement of configuration as long as the event association is maintained in the transfer of the buses $34_{nm}$.

Figure 3:
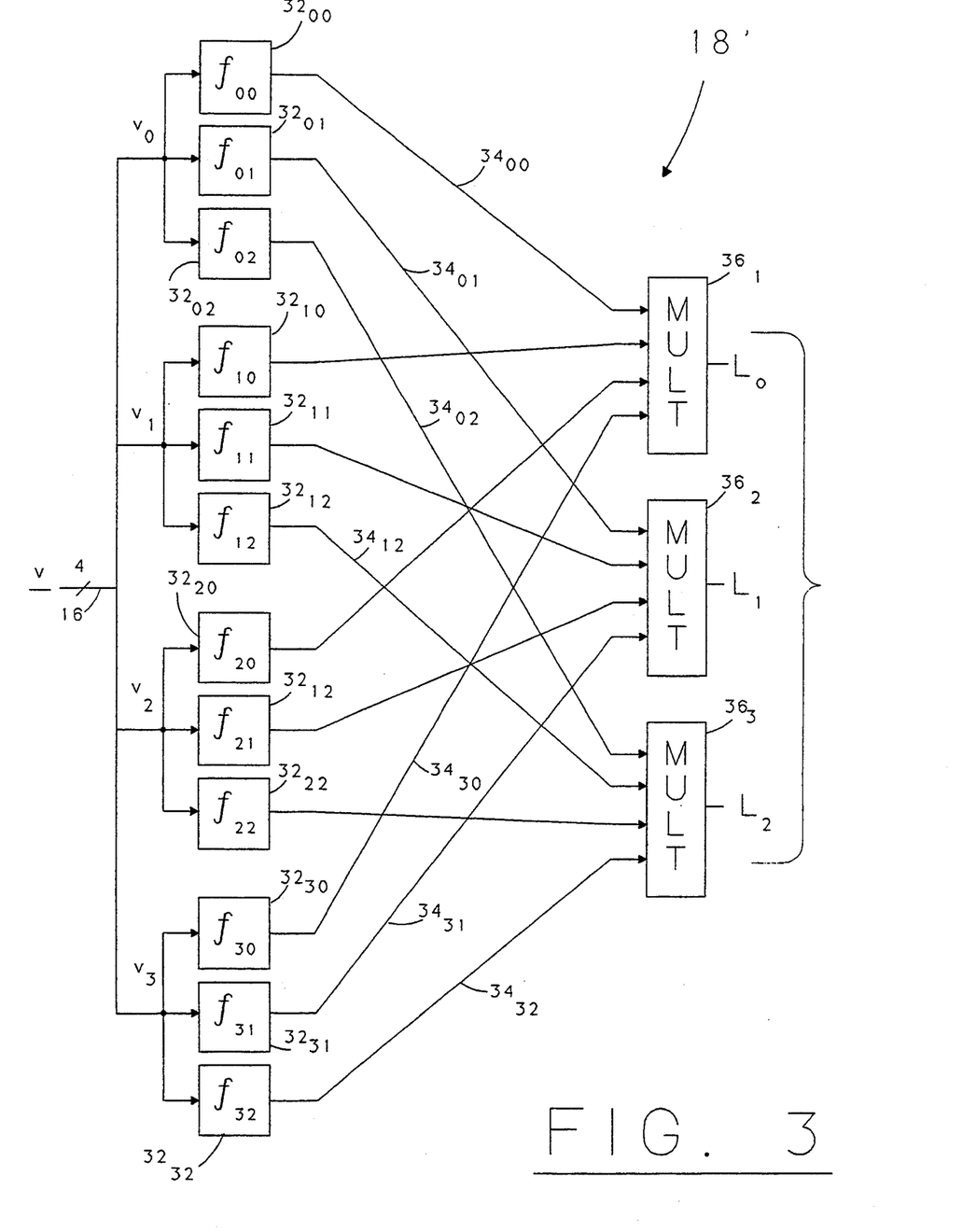
FIG. 3 illustrates a specialization of the apparatus of FIG. 2 to 4 features and 3 classes.

FIG. 3 illustrates a specific application of the apparatus of FIG. 2 using N=4 and z=3 for the feature size and number of events. In FIG. 3, there are three events being tested for and three event tests applied to each input vector feature component by the likelihood elements $32_{nm}$. The output of each of the classification groups 30 or elements 34 in FIG. 2 is directed to one of three multipliers $36_1$, $36_2$, or $36_3$. The products generated by these multipliers provide a likelihood that the input signal, vector, information corresponds to one of the three events.

Returning to FIG. 1, once an input signal vector has been processed to provide the values for the total likelihood values $L_m$ ($L_0$, $L_1$, $L_2$), the resulting likelihood vectors are transferred to a sorter 20 where they are converted into sorted likelihood values $S_m$ ($S_0$, $S_1$, $S_2$). The sorted values are then transferred to a final decision stage 22. The sorter 20 separates or ranks the likelihood vectors L for all events into a range of values between the most and least likely, or highest and lowest absolute, values. The most likely output, here $S_0$, represents the fact that a particular event is most likely the source of the input vector v, the least likely, here $S_2$, is the event which is least likely the source, and so forth.

The output from the sorter 20 provides a listing of the most and least likely events, or their associated likelihoods, but does not provide a final output. The selection of the maximum valued event or likelihood vector should only occur where certain conditions are met which guarantee a viable selection. That is, the selection is not just based on a simplistic maximum likelihood value because while this is mathematically precise it is not necessarily practically useful. The maximum likelihood value could comprise a mathematically larger value which is still lower than system noise or accuracy which can be impacted by poor sensor data, signal conditions, and many other factors.

Therefore, a decision stage 22 receives each of the sorted values $S_m$, and determines several potential classifications or outcome likelihoods for classifying the original input vector v. In the case of three likelihood separations or events, there are seven possible classifications. The selection of one of the three (or m) events as a definite classification output represents three potential classifications, and the desired type of decision element output. There are three more potential output states which arise from a larger uncertainty as to the outcome and that there is a relative tie between two of the three events, and that a particular class was not included in this tie. Finally, one potential output state occurs when the outcome is not at all clear and the classifier is unable to provide even a most likely selection or classification. This latter output provides a means to assure at least a minimum order or "crispness" to the selection process. If additional events, more than three, are utilized, then there are additional output states possible. The number of states is easily represented as:

$$\text{States} = \left[ \sum_{s=0}^{M-1} (M-1) - s \right] + 1$$

If the elements of S are ordered into a matrix output structure then we have:

$$[S] = \begin{bmatrix} \max(L) \\ \Sigma L - \max(L) - \min(L) \\ \min(L) \end{bmatrix}, \text{ here, } \begin{bmatrix} 0.313 \\ 0.21 \\ 1.384*10 - 5 \end{bmatrix}$$

Each of the sorted values $S_m$ correspond to one unsorted likelihood vector $L_m$. The maximum and minimum values are selected by selecting the highest and lowest $S_m$ values, respectively. Then the event designation m for the corresponding likelihood vectors $L_m$ are chosen as the maximum and minimum likelihood events.

Given the absolute rankings of the likelihood vectors, a series of thresholds are used to further discriminate between a viable choice or output and less or certain output states. The first threshold is applied to the value for the maximum likelihood, here $S_0$, and establishes a base value above which any viable choice must extend. This first threshold, labeled $TH_1$ (in the figure), it used to select the minimum-allowable likelihood value to assure that the input is significantly above noise or other generally small likelihood values before a decision is made. An exemplary value found useful for implementing this discrimination threshold for applications of interest is about 0.1. Of course, other values can be employed depending upon the characteristics of the application.

A second threshold, labeled here as $TH_2$, is employed to determine the minimum separation ratio between adjacent values and assure that the selected maximum exceeds the remaining likelihood values by a minimum amount. This threshold value depends on additional application characteristics and on the closeness of the discriminants being employed. Where the discriminants are widely spaced this threshold should be large and where the packing is much closer, this threshold should be small. A threshold value found useful for implementing the invention is typically on the order of about 1.1.

These thresholds, then, allow the establishment of control rules, or control signals within a given process mechanization for determining when a definitive choice can be made or not. After these decisions are made, a choice is output.

If the maximum value $S_0$ exceeds $TH_1$, it is provisionally accepted as a maximum likelihood output, otherwise there is either no decision output or outputs such as "NONE" or "DO NOT KNOW". If the provisionally selected maximum value is also larger than the next largest likelihood value, by the preselected amount, then the event designation m for that value is selected as a definitive output. Otherwise, if the provisionally selected maximum fails to exceed the next maximum by the predefined threshold, $TH_2$, there may be two very close values and the output is considered a tie or "TOSS UP". However, to provide the event values m for the maximum and next highest sorted likelihoods as being tied, the next highest value must also exceed the minimum (or next highest for m greater than 3) by the same threshold value, $TH_2$. Provided the threshold tests are met, the two "tied" events are chosen as outputs, otherwise the "DO NOT KNOW" output is provided. Alternatively, the non-tied event can be output or used to provide information in further processing stages.

Those skilled in the art will be familiar with extending these threshold tests to larger numbers of events where appropriate, but for purposes of clarity in illustration three events are employed in the illustration of the figures. These thresholds allow the establishment of control rules, or control signals, $Control_m$, within a given process mechanization. Where m=3 the above output tests can be restated as a series of control tests for the decision process defined as:

$Control_0 = 1$ if $S_0 > TH_1$, otherwise $= 0$
$Control_1 = 1$ if $[S_0/(S_1 + TH_0)] > TH_2$, otherwise $= 0$
$Control_2 = 1$ if $[S_1/(S_2 + TH_0)] > TH_2$, otherwise $= 0$ and a master control signal is provided in the form of a single column matrix $$\text{CONTROL} = \begin{bmatrix} Control_0 \\ Control_1 \\ Control_2 \end{bmatrix}$$

A third threshold value $TH_0$ was inserted into the above control tests in order to assure non-divide by zero conditions during classification processing. A relatively small non negative number such as $1*10^{-8}$ is found useful for this threshold value. The use of this threshold value depends on the specific application.

As will be appreciated by those skilled in the art, there are several ways in which the above threshold tests and control signals can be implemented to test and choose the sorted likelihoods. An exemplary preferred embodiment which mechanizes these operations is illustrated in schematic form in FIG. 4.

Figure 4:
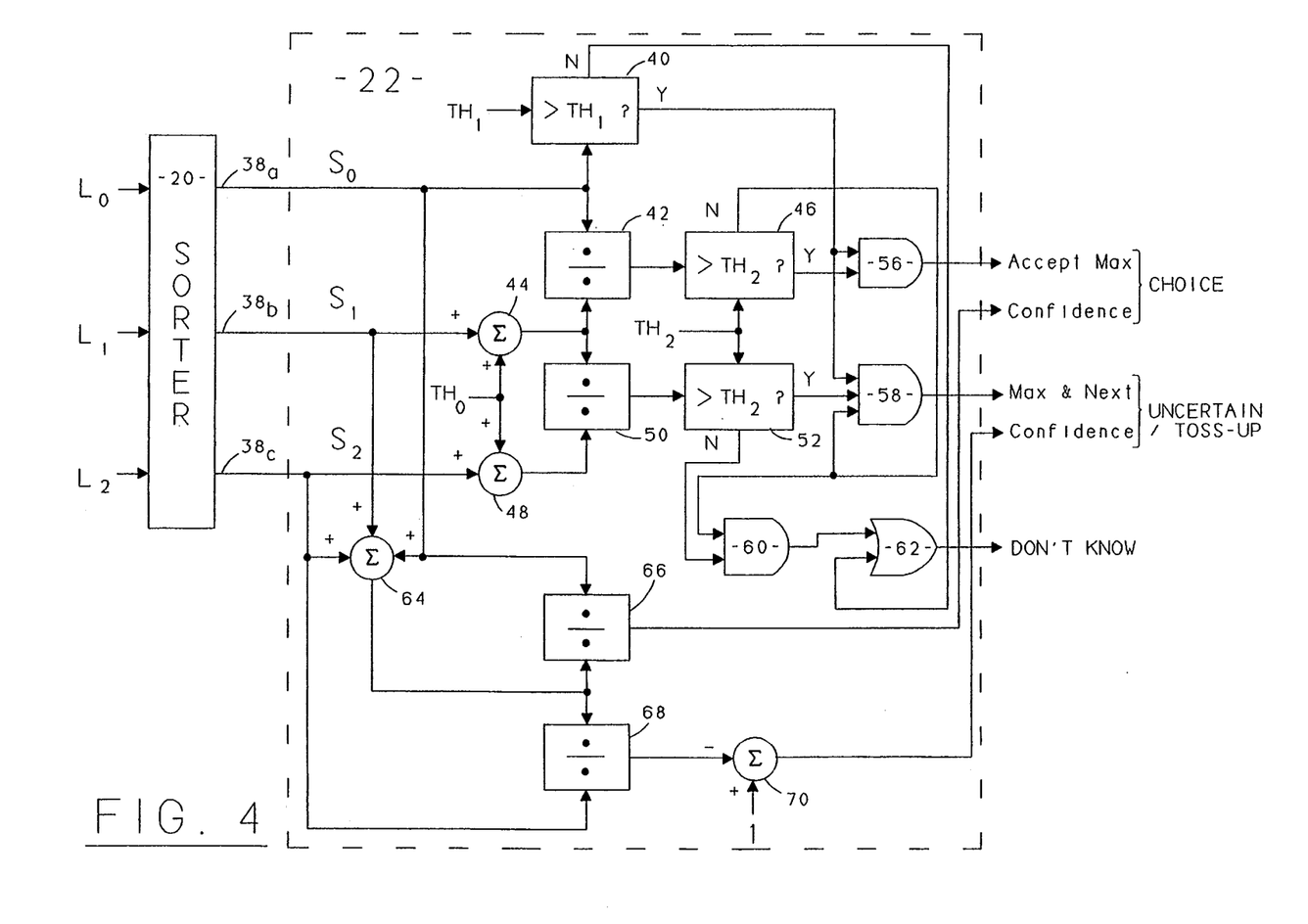
FIG. 4 illustrates a combination likelihood sorter and decision apparatus useful in constructing the classifier of FIG. 1.

In FIG. 4, the sorter 20 is shown connected to the decision element 22 through the three, or more, input busses 38. The busses 38 provide the maximum, minimum and in-between event likelihood values. The maximum likelihood value, $S_1$, is transferred to a threshold element 40 and a divide-by element 42. The threshold element 40 comprises circuitry known in the art such as a comparator for determining if the maximum signal is above the first threshold level, $TH_1$.

The maximum signal is used as a numerator input for the two input divider element 42. The second input, the denominator input, is connected to receive the next largest, or middle, likelihood value, $S_1$. The third predefined threshold value, $TH_0$, is added to the next maximum using an adder 44 which contains a memory or register element for storing the third threshold. The quotient generated by the divider 42 is transferred to a second comparison element 46 where it is compared to the second predefined threshold, $TH_2$. At the same time, the minimum likelihood selection $S_2$ is transferred to an adder 48 where the third threshold level is added, and then as the denominator input of a two input divider 50. The resulting quotient is then transferred to a third comparison element 52 for comparison to the second threshold $TH_2$.

It should be understood that where the apparatus stores the threshold values, or otherwise receives a reference signal or level for the threshold comparison, the threshold elements can be configured to use variable threshold values. That is, the classifier 10 can be configured to utilize dynamically reconfigurable threshold values to allow maximum flexibility across and within given applications.

As shown in FIG. 4, each comparison element has two outputs and is configured to provide one of the two logic level outputs on one output and the opposite logic level signal on the other. If the value submitted exceeds the threshold in either of the comparison elements 40, 46, or 52, then a "yes" or logic "1" is provided on the output bus labeled Y for "yes" and a logic "0" on the output labeled N for "no". If the submitted value fails to exceed the threshold level being tested, a "no" or logic "0" is output on the "yes" line and a "1" on the "no" line. In other words, the "yes" and "no" lines are driven high when the input does or does not exceed the threshold, respectively. The outputs of the comparison element 40 comprises the $Control_0$ value, while the outputs for the comparison elements 46 and 52 correspond to $Control_1$ and $Control_2$, respectively.

The comparison elements 40, 46, and 52 are followed by four logic gate elements, AND gates 56, 58, and 60, and an OR gate 62. If the maximum likelihood value exceeds threshold one, a high or "1" is provided on the element 40 "yes" line and a "0" on the "no" line, otherwise a "no" or logic "0" is provided on the "yes" line and a "1" on the "no" line. The AND gate 56 receives the "yes" outputs for the comparison elements 40 and 46 and provides a high logic level output when both thresholds have been exceeded in the appropriate test. The AND gate 58 is a three-input gate connected to receive the "yes" outputs of the comparison elements 40 and 52, and the "no" output of the comparison element 46. The AND gate 60 is a two-input gate receiving the "no" outputs for both of the comparison elements 46 and 52. The OR gate 62 is a two-input gate receiving the logic output of the AND gate 60 and the "no" output of the comparison element 40. If all tests fail or if the initial threshold is not met, the OR gate 62 provides a high logic output level which is used to trigger the "DO NOT KNOW" output.

In the meantime, the sorted likelihood values $S_m$ ($S_0$, $S_1$, $S_2$) are all summed in a summation element or adder 64 to provide a basis for normalizing the maximum and minimum likelihood values to provide the desired measurement of confidence in decisions. The result is a conditional probability which is the correctness or confidence of the answer. The output of the adder 64 is provided as a denominator input to each of two dividers 66 and 68. Dividers 66 and 68 receive the maximum and minimum likelihood values $S_0$ and $S_2$, respectively. The output of the divider 66 represents the confidence of the maximum likelihood value being a correct choice. The output of the divider 68 is subtracted from one in the summation element or adder 70 to provide the confidence indication for uncertain or tie decision outputs.

When the output of the gate 58 is high the event associated with the maximum likelihood value is chosen as the system output. The event is named and the likelihood value can be output. If the output of the gate 58 is high, the result is less certain and the names of the tied events are output, or the event that is not part of the tie. Finally if the output of the OR gate 62 is high, no event is selected and a non-choice output is made.

Those skilled in the art will be able to provide several circuits which can utilize the three gate and two divider outputs to provide the event decision or choice as convenient to the desired application. One technique is to assign numerical values to the various output states and provide a conversion element which converts the gates output states to the appropriate numerical value. An example is the assignment of 0, 1, and 2, the event designators for the likelihood vectors, for the definite event selections, 3, 4, and 5 for the tie selections where the number matches the 0, 1, or 2 vector but represents the event not included in the tie). A numerical output of 6 is used for the unclear or "no choice" state. To easily implement this approach the maximum and minimum sorted likelihood values are first defined as:

If $L_m = \max(L)$ then p=m, otherwise p=−1
If $L_m = \min(L)$ then q=m, otherwise q=−1
and
MAX = maximum of p,
MIN = maximum of q,
with MID = 3 − (MAX + MIN)

The value of −1 was chosen to assure no ambiguity in the system classification response. For values of MAX=0, MIN=2, then MID=1.

Using this control information, the output of the decision logic will be MAX if $Control_0 \approx 0$ and $Control_1 \approx 1$, 3+MIN if $Control_2 \approx 1$, and 6 otherwise. At the same time, the confidence level is:

$$\frac{\max(L)}{\Sigma L}$$

if the output is less than 3, but $$1 - \frac{\min(L)}{\Sigma L}$$

if the output is less than 6, and
0 otherwise.

For this configuration, when the output equals 0, 1, or 2, a singular key decision has been made, for an output of 3, 4, or 5, one event is excluded and the others are considered tied, and for a 6 there is no decisive choice of an event.

In any decision or selection technique, the resulting output is a selection of one or more likelihood values which must be correlated with corresponding event numbers or names. This can be accomplished in a variety of ways known to those skilled in the art. In the preferred embodiment of FIG. 1, a selection or output element 24 is connected to receive the output from the decision logic element 22 and also the sorter 20 through a set of event buses 26. The event buses 26 transfer the number of name of each event in relation to the associated sorted likelihood values. That is, a portion of the sorter 20 uses comparison elements and other means to provide an indication of the corresponding event number of name for each sorted likelihood value. With this information the selection element 24 decodes the selection of one or more likelihood values, as maximum or next maximum in the decision logic 22, into an appropriate event selection for output.

What has been described is a new technique for classifying information or signals as to an originating event which is very efficient and economical to implement. This technique can be implemented to analyze signals in very short times.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method for classifying a moving vehicle as falling within one of the least three preselected categories, the method comprising the steps of:
   (a) sensing, with at least one motion sensor, a plurality of signals from the vehicle;
   (b) extracting a plurality of feature values from the sensed signals;
   (c) determining, for each feature value and for each preselected category, a conditional likelihood that the feature value was extracted from a signal from a vehicle in that category;
   (d) for each category, multiplying together the conditional likelihoods for all feature values to provide a category likelihood;
   (e) sorting the category likelihoods into a maximum category likelihood, a next maximum category likelihood, and a lower maximum category likelihood;
   (f) providing, as an output, a designation for the category which corresponds to the maximum category likelihood when that category likelihood exceeds a preselected first threshold and exceeds the next maximum category likelihood by a second preselected threshold;
   (g) providing, as outputs, multiple designations for categories which correspond to the maximum and next maximum category likelihoods when all three of the following conditions obtain:
   (1) the maximum category likelihood exceeds the first threshold;
   (2) the maximum category likelihood does not exceed the next maximum category likelihood by the second threshold; and
   (3) the next maximum category likelihood does exceed the lower maximum category likelihood by the second threshold; and
   (h) providing, as an output, no designation for a category when either of the following conditions obtains:
   (1) the maximum category likelihood does not exceed the first threshold; or
   (2) the maximum category likelihood does not esceed the next maximum category likelihood by the second preselected threshold, and the next maximum category likelihood does exceed the lower maximum category likelihood by the second preselected threshold.

2. The method of claim 1, further comprising the step of generating a confidence level for the provided output designation, the confidence level being the sum of the conditional probabilities of the designated categories.

3. The method of claim 1, wherein the step of determining, for each respective feature, the conditional likelihood that a feature value was extracted from a signal from a vehicle in a predetermined category comprises the step of inputting the feature value as an address to each of a plurality of memory devices, each of which contains conditional likelihoods that the feature value was extracted from a signal from a vehicle in that category.

4. The method of claim 1, wherein the step of providing a designation for the category which corresponds to the maximum category likelihood comprises the steps of:
   (a) determining if the maximum category likelihood exceeds the first threshold in a first comparison element which provides two-state "yes" and "no" outputs;
   (b) determining if the maximum category likelihood exceeds the next maximum category likelihood by the second threshold in a second comparison element which provides two-state "yes" and "no" outputs;
   (c) applying a first logical AND operation to "yes" outputs for the first and second elements; and
   (d) selecting, as an output, the category which corresponds to the maximum category likelihood when the AND operation generates a logic ONE.

5. The method of claim 4, wherein said step of providing two designations for the category comprises the steps of:
   (a) determining if the next maximum category likelihood also exceeds the lower maximum category likelihood by the second preselected threshold in a third comparison element which provides two-state "yes" and "no" outputs;
   (b) applying a second logical AND operation to "yes" outputs for the first and third comparison elements and a "no" output for the second element; and
   (c) selecting categories which correspond to the maximum and next maximum category likelihoods as outputs when the AND operation generates a logic ONE.

6. The method of claim 5, wherein the step of providing "no" designations for the category comprises the steps of:
   (a) applying a third logical AND operation to "no" outputs for the second and third comparison elements;
   (b) applying a logic OR operation to the output of the third logic AND operation and the "no" output of the first comparison element; and
   (c) selecting a "no" output when the OR operation generates a logic ONE.

7. The method of claim 6, further comprising the step of generating a confidence for the provided output designation, the confidence generating step comprising the steps of:
   (a) dividing the maximum category likelihood by the sum of all conditional likelihoods to provide a confidence in the designation of the category corresponding to the maximum category likelihood; and
   (b) dividing a minimum category likelihood by the sum of all conditional likelihoods and subtracting the result from one to provide a confidence in the designation of the categories corresponding to multiple category likelihood values.

8. Apparatus for classifying a moving vehicle as falling within one of at least three preselected categories, the apparatus comprising:
   (a) means, comprising at least one motion sensor, for sensing a plurality of signals from the vehicle;
   (b) means for extracting a plurality of feature values from the sensed signals;
   (c) means for determining, for each feature value and for each preselected category, a conditional likelihood that the feature value was extracted from a signal from a vehicle in that category;
   (d) means for, for each category, multiplying together the conditional likelihoods for all feature values to provide a category likelihood;
   (e) means for sorting the category likelihoods into a maximum category likelihood, a next maximum category likelihood, and a lower maximum category likelihood;
   (f) means for providing, as an output, a designation for the category which corresponds to the maximum category likelihood when that category likelihood exceeds a preselected first threshold and exceeds the next maximum category likelihood by a second preselected threshold;
   (g) means for providing, as outputs, multiple designations for categories which correspond to the maximum and next maximum category likelihoods when all three of the following conditions obtain:
      (1) the maximum category likelihood exceeds the first threshold;
      (2) the maximum category likelihood does not exceed the next maximum category likelihood by the second threshold; and
      (3) the next maximum category likelihood does exceed the lower maximum category likelihood by the second threshold; and
   (h) means for providing, as an output, no designation for a category when either of the following condition obtains:
      (1) the maximum category likelihood does not exceed the first threshold; or
      (2) the maximum category likelihood does not exceed the next maximum category likelihood by the second preselected threshold, and the next maximum category likelihood does exceed the lower maximum category likelihood by the second preselected threshold.

9. The apparatus of claim 8, further comprising means for generating a confidence level for the provided output designation, the confidence level being the sum of the conditional probabilities of the designated categories.

10. The apparatus of claim 9, wherein the confidence generating means comprises:
    (a) means for summing all sorted category likelihoods, thereby producing a sum;
    (b) means for dividing the maximum category likelihood by the sum so as to provide a confidence in the designation of the category corresponding to the maximum category likelihood;
    (c) means for dividing a minimum category likelihood by the sum, thereby producing a quotient; and
    (d) means for subtracting the quotient from one to provide a confidence in the designation of the categories corresponding to multiple category likelihoods.

11. The apparatus of claim 8, wherein the means for determining conditional likelihoods comprises a plurality of nm memory devices where n is the number of features and m is the number of potential events, each memory device containing conditional likelihoods for a feature within one preselected category, each of said memory elements being coupled to receive a feature value.

12. The apparatus of claim 8, wherein memory devices having conditional likelihoods associated with a common category have their respective outputs connected to inputs of a single multiplier.

13. The apparatus of claim 8, wherein the means of claim 9(f) comprises:
    (a) a first comparison element connected to receive the maximum category likelihood and to generate two-state "yes" and "no" outputs dependent upon if the maximum category likelihood exceeds the first threshold;
    (b) a second comparison element connected to receive the maximum category likelihood and the next maximum category likelihood and to generate two-state "yes" and "no" outputs dependent upon is the maximum category likelihood exceeds the next maximum category likelihood by the second threshold in
    (c) means connected to the first and second comparison element "yes" outputs for applying a first logical AND operation to the output states; and
    (d) means for selecting, as an output, the category which corresponds to the maximum category likelihood when the first logical AND operation generates a logic ONE.

14. The apparatus of claim 13, wherein the means of claim 9(g) comprises:
    (a) a third comparison element which provides two-state "yes" and "no" outputs connected to receive the next maximum category likelihood and the lower maximum category likelihood and to detect when the next maximum category likelihood also exceeds the lower maximum category likelihood by the second preselected threshold;
    (b) means connected to the first and third comparison element "yes" outputs and the second element "no" output for applying a second logical AND operation to the output states; and (c) means connected to the means of claim 14(c) and the means of claim 15(b) for selecting categories which correspond to the maximum and next maximum category likelihoods as outputs when the AND operation generates a logic ONE.

15. The apparatus of claim 14, wherein the means of claim 9(h) comprises:

(a) means for applying a third logical AND operation to "no" outputs for the second and third comparison elements;

(b) means for applying a logic OR operation to the output of the third logic AND operation and the "no" output of the first comparison element; and (c) means for selecting a "no" output when the OR operation generates a logic ONE.

* * * * *